Aug. 5, 1941.  K. G. PLITT, SR., ET AL  2,251,801
FRESH MEAT PRODUCT AND PREPARATION
Filed Dec. 6, 1940
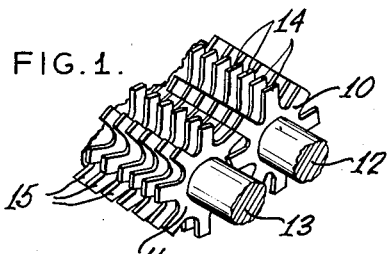
FIG. 1.
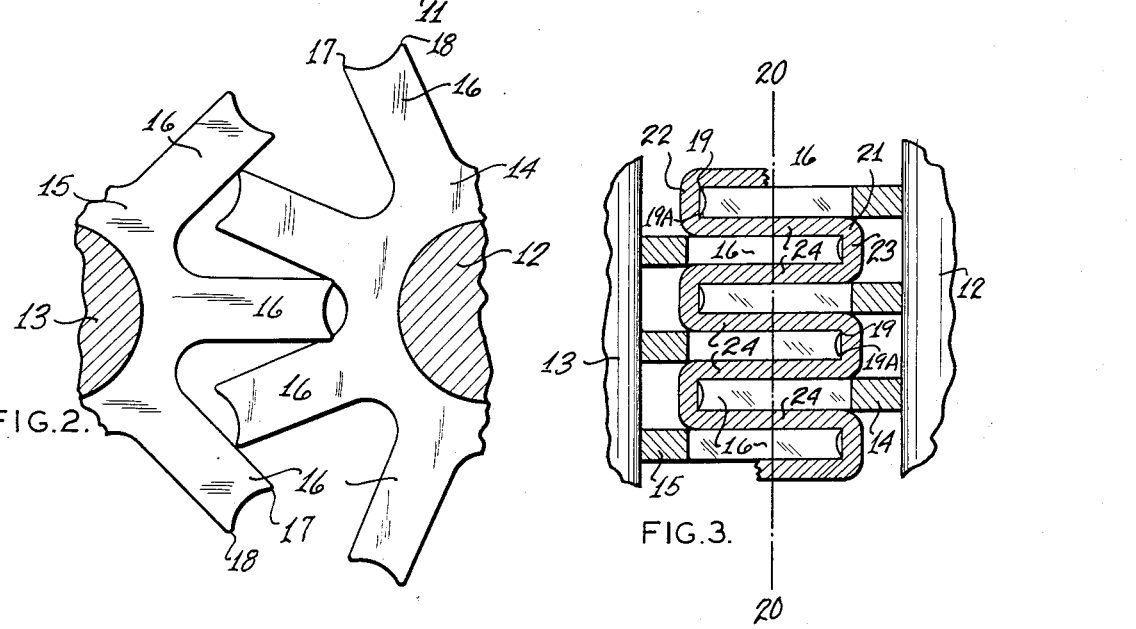
FIG. 2.
FIG. 3.
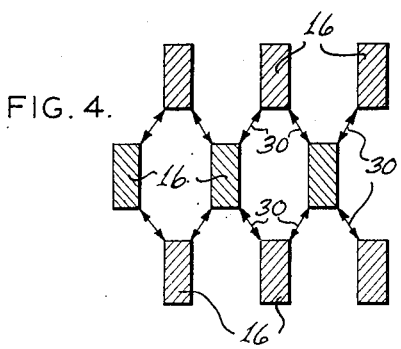
FIG. 4.
INVENTOR.
KARL G. PLITT SR.
KARL G. PLITT JR.
BY Robert B. Terry
ATTORNEY Patented Aug. 5, 1941

2,251,801

UNITED STATES PATENT OFFICE 2,251,801

FRESH MEAT PRODUCT AND PREPARATION

Karl G. Plitt, Sr., St. Louis, and Karl G. Plitt, Jr., University City, Mo.

Application December 6, 1940, Serial No. 368,756

8 Claims. (Cl. 99—107)

This invention relates to improvements in fresh meat products and preparation, and more particularly to an improved treatment of fresh meat products for the purposes of rendering the product more uniform in texture and quality, and to convert such products to a more desirable physical form, such as a homogeneous loaf or steak, for dispensing to the trade.

The present aplication constitutes a continuation, in part, of the copending application of Karl G. Plitt, Sr. et al., filed December 13, 1939 under Serial No. 308,948.

The process as disclosed and claimed in the earlier application aforesaid, has proven extremely desirable as evidenced by trade acceptance and steadily increasing demand. However, chiefly as affecting appearance and physical characteristics of the earlier product as dispensed, it is noted that under certain conditions, there is a tendency for the slices of the product to separate from each other, as in quick cooking. Rarely does any of the individual slices separate entirely from the compacted loaf or steak, but it has been found more acceptable to the trade and in usage, to provide an improved method of compacting the slices in the loaf in such manner that, even through the stage of cooking, as by frying or broiling, the individual slices of the product are not apparent, and the product, although composed of relatively thin superposed layers, is to all intents and appearance, a unit of meat of highly homogeneous characteristics and texture. This result has been attained as a result of long and arduous experiments, and constitutes the principal objective of the present invention.

A further object of the invention is attained in a method for compacting superposed slices of meat into a unified mass, such that, irrespective of the angle of cutting and irrespective of any reasonable degree of deflection or bending of the meat product, it still retains its unified aspect or character.

A still further object of the invention is attained in a method of compacting relatively thin, stacked slices of fresh meats, which process is applicable to sliced meats generally, without necessarily requiring the more advantageous pretreatment of the meat in keeping with the full process disclosed by application Serial Number 308,948, above more fully designated.

Expressed in terms of the characteristics of the product, in distinction from the process utilized, it is a further object of the invention to produce a commercial article of meat which is or may be in the form of a steak or loaf, or may be produced in semblance of a chop, or any other desirable physical form acceptable to the trade, and in which, although the meat is homogenized and formed up of stacked slices or layers, it is scarcely visibly distinguishable from an original integral steak, slice or cut.

Further objects and advantages of the invention will more clearly appear from the following detailed description, considered in connection with the accompanying drawing, in which:

Fig. 1 is a fragmentary elevation in perspective of the ends of a pair of rolls or rollers suitable for compacting slices of meat in accordance with the process of the present invention; Fig. 2 is an enlarged fragmentary end elevation of portions of the toothed discs carried by the rolls of Fig. 1; Fig. 3 is a diagrammatic showing of portions of the cooperating tooth elements in the device of Fig. 1, and the relation of such elements to a typical body of meat while subjected to treatment in accordance with the present development, and Fig. 4 is a diagrammatic showing to illustrate the spaced and staggered areas of engagement of the meat by the equipment shown in Fig. 1, and to indicate the lines or direction of stretch or tension imparted to the meat by the treatment in accordance with our development.

Proceeding now to a description of the preferred process of treating the meat, it may be noted as a preference for best results, although not essential to the practice of the novelty of the present improvement, that the meats be first treated substantially in accordance with the disclosure of application Serial No. 308,948. For completeness of present discussion it is felt necessary only to refer to the principal steps in treatment as heretofore outlined, namely: The meat is first boned, and the boned pieces are placed in a rectangular mold preferably composed of telescopic halves of cast aluminum, following which the upper and lower halves with the boned meat therebetween, are subjected to high physical pressure for a protracted period. This pressure is preferably of the order of 200–250 lbs. per sq. in. and may be applied either hydraulically or mechanically according to the press equipment available. The mold and contents, preferably while under pressure, are subject to freezing, say at a temperature of 15° F. for a period of 48 hours, or are otherwise refrigerated so that the meat mass in the mold becomes entirely solid. The pressure alone will serve, by cell rupture, to release a great part of the meat juices. Hard freezing, even without the mechanical pressure, will likewise serve to rupture the meat cells to a certain extent, and so will release a proportion of juices, but it has been found most advantageous to utilize the freezing step while the mold is under the high physical pressure noted.

Following the cell rupturing treatment, whether by pressure, hard freezing or both, the mold and the contents are submersed in hot water for a short time to effect a surface thawing of the meat, and to enable a ready removal of the meat mass from the mold. After release of the meat it is permitted to attain a temperature of at least 34° F. or even higher, which usually will require about six hours. The meat mass after a slight thaw, is sliced, preferably in an automatic slicing machine, and for purposes of forming a loaf or artificial steak, relatively thick slices are produced. It is however noted that the slice thickness ranges from a number five slice to any higher thickness desired, say from thirty-two slices to the pound (half ounce) to a one pound slice.

The product in substantially the form for dispensing, as in a steak form, consists of two or more of the slices stacked in such manner that the adjacent slices are laid up with the grain of each at an acute angle or a right angle to the slice thereabove or therebelow. This staggering of the grain of adjacent slices such that the corresponding coarser or tougher portions of each slice is out of register with the corresponding portions of the adjacent slices, is for convenience herein, and in the claims, referred to as "cross-piling."

As thus far described, the process of preliminary treatment prior to compacting or unifying the slices of the product into a single homogenous unitary or substantially integral mass, is substantially the same as set forth in copending application Serial No. 308,948.

For the purposes of producing a better compacting effect of the several slices, and what is apparently a truly integral meat product although of laminated form, we have conducted a series of experiments to determine the best method of dependably attaining this result such that the sliced product will retain its integral nature even through the stages of cutting, cooking and serving.

It has been found that merely compressing the slices, even under substantially high pressures, between plain pressure platens each of planar aspect, will not fully satisfactorily attain the desired result. This result has been attained however by stretching or subjecting to a tensioning stress, the several slices or layers of the composite stack or loaf, this stretching effect presumably being imparted to localized, defined staggered areas of each of the several slices, and while such portions are under stress or stretch, compressing them upon one another by suitable equipment to be described. It has been further found convenient and satisfactory, in case the loaf or stack to be dispensed is of not too great a thickness, so to process the several slices or layers simultaneously with a saving of time and cost with this operation. It is of course possible and within the intended scope of the invention, that the individual slices may be separately stretched in defined local areas, and either during or shortly following the stretching step, compacted upon one another. The stretching or tensioning of the staggered areas of the meat, preferably includes also, processing the meat slices in such manner that there is imparted to the stressed areas of the slices a certain permanent set, which of course may not be as pronounced as the original deformation of the slice thus treated. It is a preference to compact the slices by pressing them firmly upon or against each other while the stretched areas or zones of the slices are collectively under distortion by the tension.

Referring now to one form of apparatus which has been found suitable for the purposes described, there is shown by Fig. 1, a pair of rolls 10 and 11 carried respectively by powered rotary shafts 12 and 13. The details of the drive shafts 12 and 13 are not material to the present discussion, it being noted however that the shafts are preferably geared to each other so that they bear a constant rotary relation to each other in operation, always working together in proper time.

Carried by each of the shafts 12 and 13 and forming the roll structures above collectively referred to, are a plurality of toothed discs, indicated generally at 14 and 15 respectively on the shafts 12 and 13. Each of these discs is in the form of a star wheel or like element characterized by a plurality, for example eight, radial arms 16, each arm being further characterized by a peripheral portion or tooth-forming tip of furcate construction, resulting in tooth portions 17 and 18.

It best appears from Fig. 1 that the arrangement of the discs 10 and 11 in each roll, is such that the adjacent discs and hence the arms 16 are spaced apart a distance slightly in excess of the width of each arm, this relation best appearing in Fig. 3. It will further be noted that the assembly of discs on or in each roll is axially staggered with respect to the corresponding parts of the companion roll with the result that, when the shafts 12 and 13 are concurrently rotated, with nothing therebetween, the discs and arms of one assembly freely interleave those of the companion assembly as will readily appear from Fig. 3. It will also appear from Figs. 1 and 2, that the adjacent discs in the double roll assembly are so arranged and gear-timed by driving elements (not shown) that the arms 16 are angularly staggered with respect to the arms of the adjacent disc of the opposite roll so that in operation, the arms of adjacent yet opposite discs, are never in register.

To describe now the effect of treatment of the apparatus on the individual or stacked slices of pretreated meat, it is a preference to feed the stacked, loosely compacted slices in a plane intermediate the axes of the shafts 12 and 13, being also the axes of the rollers or rolls. Assuming the shafts 12 and 13 to be horizontal, feeding would thus take place downwardly in a substantially vertical plane. The meat slices are caught up by the opposite arms 16 of the paired rolls, rotating toward each other. The plane of feeding of the meat is, for convenience of understanding, designated by the line 20—20 in Fig. 3, and it will appear that the opposite arms 16 coact in deflecting the meat slices from the plane of their original downward movement. Thus with reference to Fig. 3, the uppermost arm 16 will provide a temporary abutment or anchorage for the meat, through its points 19 and 19A, the zone of abutment or anchorage of the meat mass 21 being indicated at 22. Similarly, an opposite anchorage zone 23 will be provided by the end portion of the adjacent arm 16, and so across the stack of meat being fed between and acted upon by the rolls. Since, for an appreciable, although short period, the slices are held or secured in the zones 22 and 23, the portions 24 between zones 22 and 23 is subjected to a substantial stretch or tensioning effect. At the same time is is important to note that the clearance between adjacent arms 16 of opposite rolls is by no means sufficient to accommodate freely the normal thickness either of individual or stacked slices of meat therebetween. From this it results that in each of the zones 24 the slice or stack of meat is highly compressed, with a marked and desirable compacting effect.

The extent of stretch may be determined by the lengths of the arms 16 and spacing of axes of shafts 12 and 13, and the extent of compression determined by the clearance between adjacent cooperating arms 16 of the opposite rolls.

It is here to be noted that the specific instrumentality for accomplishing the steps of stretching and compressing the meat for purposes of compacting it into a relatively homogeneous mass, is not material to the present invention, since other forms of apparatus may be used for this purpose. It is for this reason that no claim is presently made to any mechanical novelty in the described apparatus per se.

The diagrammatic showing of Fig. 4 may be considered as taken on a plane parallel to the vertical axial planes of the rolls while the meat is not in process, but is added in order further to illustrate the lines of tension or stress imparted to the meat slices or stack thereof. In Fig. 4, the substantially transverse sections of the several instantly coacting arms 16 are shown. It will appear that those in, say the uppermost row appearing in Fig. 4 and the lowermost row thereof, will be carried by the same roll, either 10 or 11, while the arms of the intermediate row of this figure are those carried by the opposite or companion roller. In operation, as the slices or stack of sliced meats are fed between the rolls, stretching or tension will take place substantially in the direction of arrows 30, and by preference, a substantial compression of the stretched portions will take place by reason of the low clearance between the adjacent and coacting arms 16, as above described.

It is sometimes the case after say a stack of thin slices is fed into the paired rolls, there will appear a minor buckling or distortion effect. When this occurs, it may in such cases be advisable to subject the then-compacted stack of slices to a light depthwise pressure to restore the stack to fully planar form.

It has been found after a period of commercial usage of the method described, in conjunction with apparatus similar to that referred to for completeness, that the stacked laminated product is substantially uniform in appearance, texture, as well as cooking and eating qualities, through the whole mass. Very importantly, the stacked sliced product thus formed will show no important tendency for its slices to become separated in cooking or handling, even with intentionally rough treatment, and even though subjected to high broiling or frying temperatures while the meat is yet cold. It will thus appear that the utilization of the process described fully attains each and all of the objects above specifically stated.

Although the invention has been described in accordance with a more or less complete preferred practice for the production of so-called meat loaf products or the like, it is to be understood that, as a result of experiments on sliced meat not otherwise pretreated, the method of compacting the slices as herein described, is admirably adapted for use in connection with sliced meat generally, for the purpose of forming a sliced product into an integrated unit for dispensing.

Although the invention has been specifically described for purposes of illustration, many changes may be made in the steps of treatment, their order, and in the apparatus employed, all without departing from the full intended scope of the invention as defined by the following claims.

We claim:

1. The described method of consolidating slices of meat for dispensing in a compact unit, which consists in slicing the meat into relatively thin portions, stretching the slices, and compressing the slices so as to compact them into a unit mass.

2. The described method of preparing meat, which consists in slicing the meat, and in stretching and compressing defined, spaced areas of superposed slices, thereby compacting the slices into a unit for dispensing.

3. The described method of preparing a meat product, which consists in slicing the meat into relatively thin layers or slices, superposing the slices, and simultaneously stretching and compressing portions of the superposed slices.

4. The described method of preparing a meat product, which consists in slicing fresh meat, stretching and compressing portions of the slices, and stacking the slices in such manner that the grain of a given slice of meat is arranged at a substantial angle to the grain of an adjacent slice.

5. The described method of preparing fresh meats for consumption, which consists in slicing the meat into relatively thin layers or slices, cross-piling the slices and compacting the slices, by stretching and simultaneously compressing the slices, at least over parts of their whole areas.

6. The described method of preparing fresh meats for cooking and usage, which consists in subjecting the meat to a high external physical pressure, releasing the pressure, slicing the meat, cross-piling the slices, subjecting localized areas of the cross-piled slices to a substantial tension or stretch, and compacting the slices with the grain of each slice offset from the grain of meat of adjacent slices.

7. The described method of treating fresh meats to increase their uniformity of internal structure, which includes treating the meat to cause a rupture of at least some of the meat cells, thereby releasing a portion of the meat juices; slicing the meat under conditions to prevent appreciable loss of the meat juices, cross-piling the slices, and effecting adhesion of the adjacent slices of meat for dispensing in loaf form, by compressing the slices upon one another while portions of the slices are under stretch or tension.

8. The described method of treating fresh meats to increase their tenderness and homogeneity and for uniformity in dispensing, which consists in confining the meat in a mold of a type to retain the meat juices, subjecting the meat in a mold to a determined physical pressure to release in part, the internal juices of the meat; hard-freezing the meat while in the mold and subjected to high physical pressure, thawing the meat sufficient to permit slicing, slicing the meat, cross-piling the slices thereof, stretching at least certain areas of the cross-piled slices, as a unit, and compressing the slices upon one another while said portions are under tension or stretch.

KARL G. PLITT, Sr.
KARL G. PLITT, Jr.